US008244008B2

(12) United States Patent
Rohrer et al.

(10) Patent No.: US 8,244,008 B2
(45) Date of Patent: Aug. 14, 2012

(54) METHODS INVOLVING OPTIMIZING AND MAPPING IMAGES

(75) Inventors: Jonathan B. Rohrer, Zug (CH); Giridharan R. Iyengar, Nanuet, NY (US); Leiguang Gong, New Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 12/176,802

(22) Filed: Jul. 21, 2008

(65) Prior Publication Data

US 2010/0014722 A1    Jan. 21, 2010

(51) Int. Cl.
*G06K 9/00* (2006.01)
(52) U.S. Cl. ...................................... 382/128
(58) Field of Classification Search ......................... None
See application file for complete search history.

(56) References Cited

U.S. PATENT DOCUMENTS

| 2007/0127790 A1* | 6/2007 | Lau et al. ..................... 382/128 |
| 2008/0118125 A1* | 5/2008 | Mahesh et al. ................ 382/128 |
| 2009/0161937 A1* | 6/2009 | Peng et al. .................... 382/131 |

OTHER PUBLICATIONS

Leiguang Gong; Rohrer, J.; Iyengar, G.; Butler, B.; Lumsden, A.; , "Anatomical object recognition and labeling by atlas-based focused non-rigid registration and region-growing," Audio, Language and Image Processing, 2008. ICALIP 2008. International Conference on , vol., no., pp. 1354-1358, Jul. 7-9, 2008.*
Maintz et al., "A Survey of Medical Image Registration", Medical Image Analysis (1998) vol. 2, No. 1, pp. 1-36. Oxford University Press (1998).

* cited by examiner

*Primary Examiner* — Clayton E Laballe
*Assistant Examiner* — Dennis Hancock
(74) *Attorney, Agent, or Firm* — Cantor Colburn LLP; Daniel Morris (57) ABSTRACT

A method for optimizing images, the method comprising, receiving a designation of a first feature of interest, receiving a designation of a second feature of interest, receiving a target image, receiving an atlas image including labels of first and second features of interest of the target image and a first optimization parameter associated with the first feature of interest and a second optimization parameter associated with the second feature of interest, mapping the atlas image onto the target image resulting in a global mapped image, defining an area of the first feature of interest and an area of the second feature of interest, mapping the reference image onto the area of the first feature of interest on the global mapped image using the first optimization parameter, and mapping the reference image onto the area of the second feature of interest on the global mapped image using the second optimization parameter.

7 Claims, 6 Drawing Sheets

FIG. 4a    BIN SIZE b

FIG. 4b    BIN SIZE b/2

METHODS INVOLVING OPTIMIZING AND MAPPING IMAGES

BACKGROUND OF THE INVENTION

1. Field of the Invention

This invention relates generally to a method for optimizing digital images, and particularly to image registration of digital images.

2. Description of Background

Many imaging systems, for example medical imaging systems, use a method for automatically recognizing and labeling structures in images. For example, an image taken of an abdomen of a patient will show a variety of anatomical structures, such as a spine and arteries. Imaging systems may process the image to identify and label various anatomical structures.

Registration with an atlas is a method for automatic recognition and labeling of anatomical structures in images. An atlas is a set of data such as an image and associated data, having identified and labeled anatomical structures in the image. When a similar image is taken of a patent, the atlas may be used to register the images. The image taken of a patient is registered by a process of finding a dense transformation between the atlas image and the image taken of a patent. The registration allows automatic identification and labeling of anatomical structures.

Application of an atlas to some portions of the human body such as, for example, the human abdomen is challenging because of inter-patient morphological variability and the large number of structures present in the abdomen.

A method that allows an atlas to be used to optimize and register complicated images is desired.

SUMMARY OF THE INVENTION

The shortcomings of the prior art are overcome and additional advantages are achieved through an exemplary method for optimizing images, the method comprising, receiving a designation of a first feature of interest, receiving a designation of a second feature of interest, receiving a target image, receiving an atlas image including labels of first and second features of interest of the target image and a first optimization parameter associated with the first feature of interest and a second optimization parameter associated with the second feature of interest, mapping the atlas image onto the target image resulting in a global mapped image, defining an area of the first feature of interest and an area of the second feature of interest on the global mapped image, mapping the reference image onto the area of the first feature of interest on the global mapped image using the first optimization parameter resulting in an optimized image of the first feature of interest, mapping the reference image onto the area of the second feature of interest on the global mapped image using the second optimization parameter resulting in an optimized image of the second feature of interest, and displaying the global mapped image with the optimized image of the first feature of interest and the optimized image of the second feature of interest for use in medical diagnosis.

A method for defining an atlas image data for optimizing images, the method comprising, receiving a reference image, receiving a target image, defining a first region of interest on the reference image, defining a second region of interest on the reference image, calculating a first optimization parameter associated with the first region of interest, calculating a second optimization parameter associated with the second region of interest, mapping the reference image onto the area of the first region of interest on the global mapped image using the first optimization parameter resulting in a first optimized image of the first region of interest, mapping the reference image onto the area of the second region of interest on the global mapped image using the second optimization parameter resulting in a first optimized image of the second region of interest, determining whether the mapping associated with the first region of interest is satisfactory, calculating a calculating a third optimization parameter associated with the first region of interest responsive to determining that the mapping of the first region of interest is unsatisfactory, and saving the first optimization parameter associated with the first region of interest in an atlas image data file responsive to determining that the mapping of the first region of interest is satisfactory, wherein the atlas image data file is used in mapping patient images for medical diagnosis.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving image mapping are provided. Several exemplary methods are described.

Imaging mapping methods used in, for example, medical imaging, process a patient image (a target image) resulting in anatomical structures of interest being automatically identified and labeled. The labeling of anatomical structures allows efficient and intuitive medical analysis.

An atlas is an image volume with labeled structures. For example, an atlas image of an abdomen may include labeled anatomical structures such as a spine and an aorta. Atlas images may be stored in a database that is used to label similar target image volumes taken of a patient.

One process for labeling a target image with an atlas is called registration. In registration, a dense transformation between the atlas and a patient image volume is computed. The transformation maps the target image and the patient image onto one coordinate system. Labeled regions in the atlas are projected onto the patient volume.

An example of a family of algorithms that models the transformation is based on B-Splines. Using B-Splines, the transformation function is defined with a finite set of parameters, B-Spline coefficients. The B-Splines manipulate a mesh of control points and interpolate between the grid points to obtain a dense transformation.

The quality of a mapping may be measured with a similarity metric between the atlas and the transformed target image. Other terms, such as, for example regularization, may be incorporated into the similarity metric. An example of a similarity metric is mutual information. By means of a continuous representation of the target image with B-Splines and a Parzen histogram estimation, the similarity metric and a gradient of the similarity metric may be expressed in closed form. The B-Spline coefficients may then be determined with a gradient-based optimization algorithm, such as, for example, steepest descent or Levenberg-Marquardt.

To increase robustness and speed, a multi-resolution approach may be used. The registration is first carried out at a coarser level with fewer control points and down-sampled images. This leads to an approximative solution that is then used to initialize the transformation function on a refined level, where the registration is repeated. This process is iterated until a desired level of refinement has been reached.

Registration of medical images involving multiple anatomical structures (such as abdominal images) may prove challenging because of the large intra- and inter-patient variation of the morphology and varying image intensity. In addition to relatively stable hard tissue structures, there are multiple anatomical structures (such as blood vessels and organs) subject to soft-tissue deformation.

The B-Spline model, although providing a good approximation to such deformations in general, leads to a globally smooth function that may be undesirable. In the case of two proximal structures, the deformation for each structures may be smooth individually, but because their relative positions differ significantly between subjects, the overall transformation may show discontinuities. There are several parameters that influence the registration process, for example, the spacing of the B-Spline control points. A finer mesh allows more complex transformations to be modeled, but may also lead to a decrease of stability and suboptimal or non-invertible solutions. In addition, the optimization algorithm may be unable to process a large number of coefficients.

The exemplary methods described below improve the registration of multiple anatomical structures for the task of atlas-based automatic recognition and labeling of the structures. The methods integrate global and local optimization within domains of anatomical regions.

The exemplary methods described may be adapted to other, similar problems once parameter settings are tailored to a specific segmentation. The settings may then be used for all registrations with the atlas. The exemplary methods are not limited to specific transformation methods or analysis of the transformation methods, and use a B-Spline transformation for exemplary purposes. Other transformations may be used such as, for example, scaling functions and free form transformations.

Figure 1:
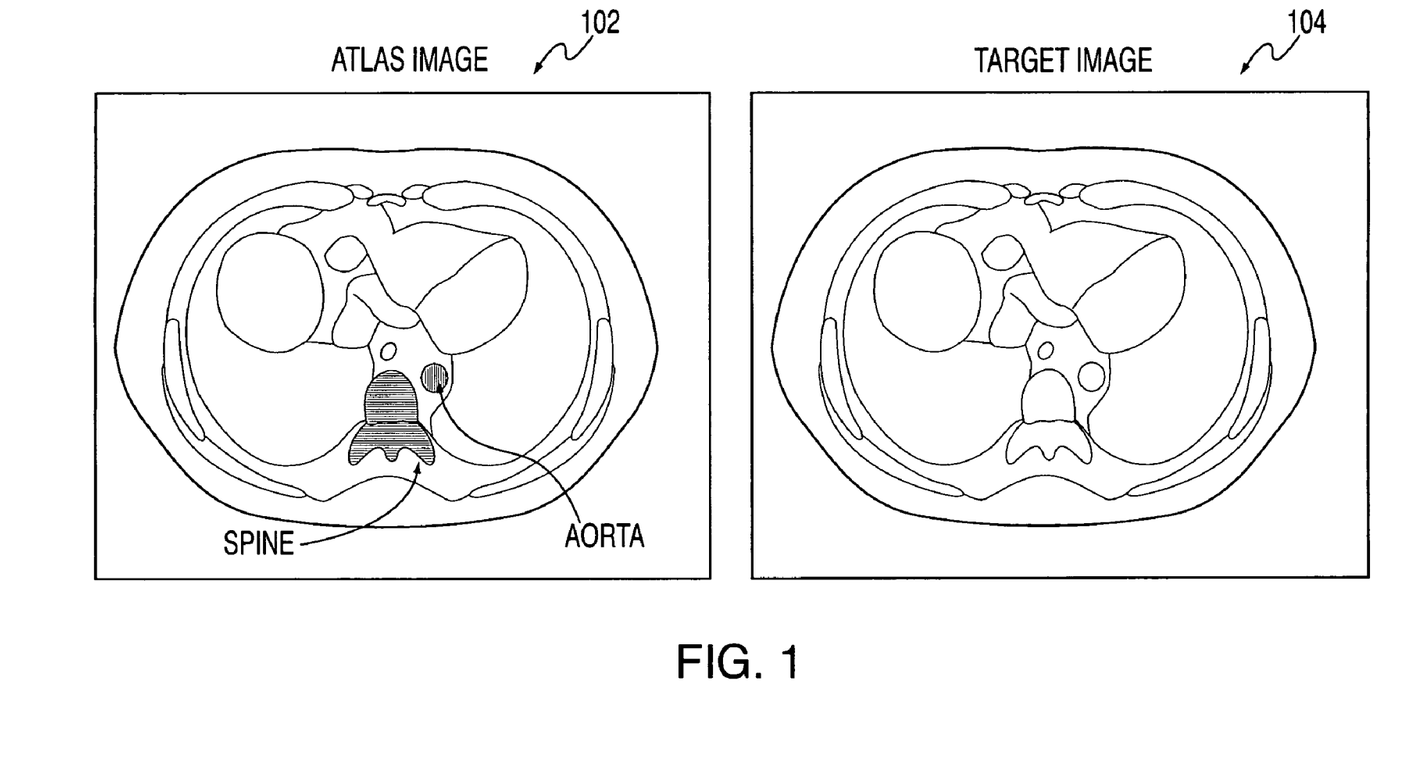
FIG. 1 illustrates computed tomography (CT) scan images.

FIG. 1 illustrates an exemplary atlas image 102 and an exemplary target image 104. The atlas image 102 includes a spine and an aorta identified and labeled. The target image 104 is a similar image of a patient abdomen. The desired mapping will map the spine and the aorta.

A coarse-to-fine strategy is used for the optimization of the B-Spline transformation coefficients. However, since an optimization of the entire image may result in an incorrect mapping of the spine or the aorta, the registration is decomposed into various domains (areas or regions of interest). A domain divides an image to a sub-image containing a structure or a set of structures. Every voxel in the fixed image has a tag that identifies a domain or domains associated with the voxel.

Optimizers are defined that act on a given domain rather than the entire image. Optimizing over a domain restricts calculations (such as the estimation of a joint histogram) to the region of interest selected while skipping points that are not inside the domain. For coefficients with a B-Spline function support that does not overlap with the domain, the similarity metric has a derivative that evaluates to 0. The coefficients that affect the transformation field within the domain are optimized. The optimization is limited to a certain part of the image, and the number of coefficients the optimizer processes is controlled. The method also enables the optimizers to have different settings, adapted to the properties of the content of the domains they are optimizing.

Figure 2:
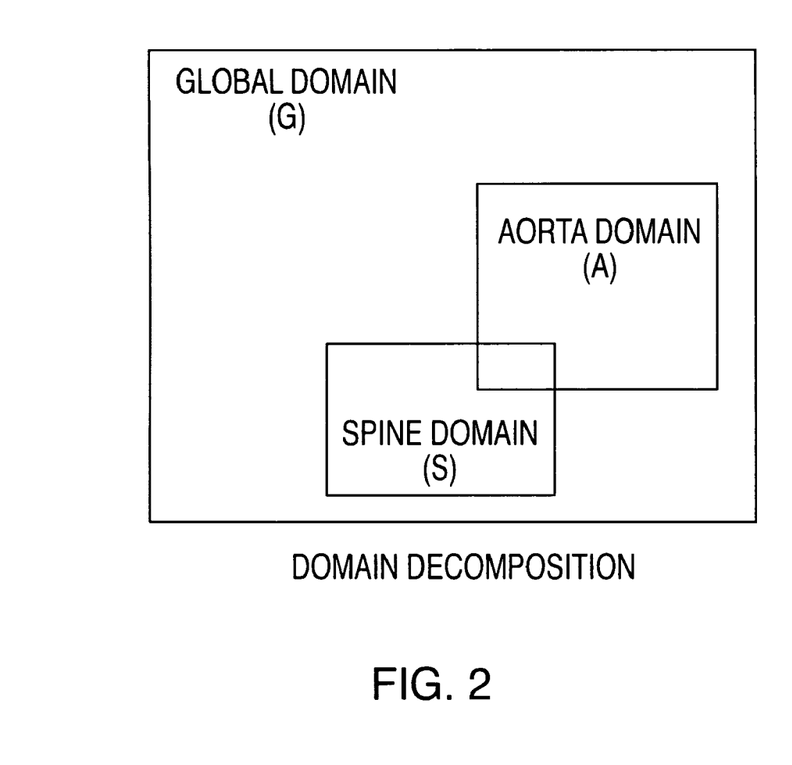
FIG. 2 illustrates an exemplary embodiment of a domain decomposition.
Figure 3:
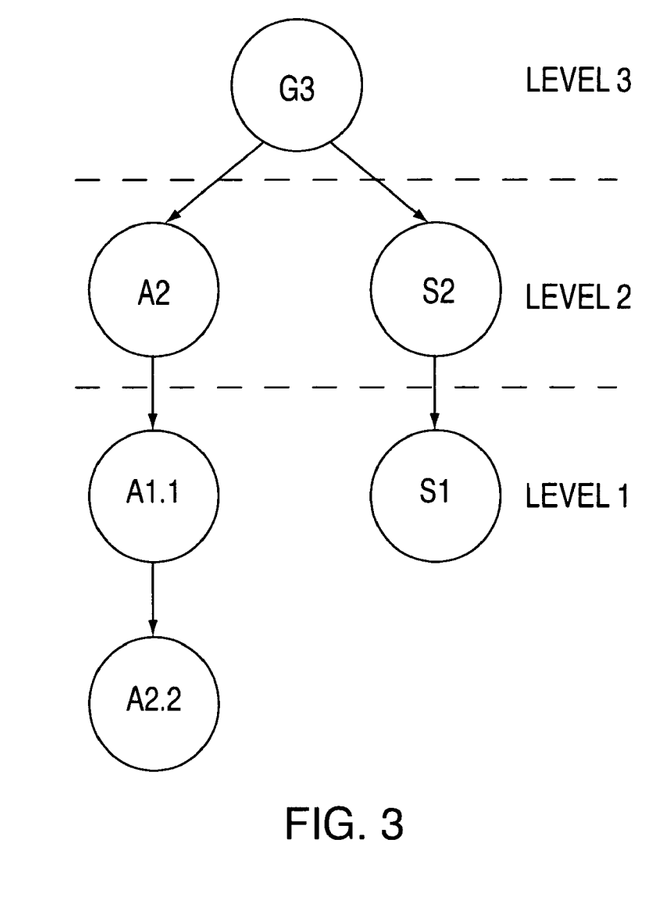
FIG. 3 illustrates a block diagram of an exemplary method for mapping images.

FIG. 2 illustrates a diagram of an exemplary domain decomposition and FIG. 3 illustrates a block diagram of an exemplary optimization process of the images of FIG. 1. The domain decomposition includes a global domain (G), a spine domain (S), and an aorta domain (A). The optimization process corresponds to the identifiers of the domains (G, S, and A).

In mapping the spine and the aorta, the method begins on the coarsest level by registering the entire image resulting in a rough alignment for the entire abdomen (a coarse globally mapped image). Patient-specific data is the target image (or the fixed image) 104 and CT image data without labels of the atlas 102 is the floating image (the image that will be transformed).

Using the solution of the coarsest level mapping, the labels of the spine and the aorta in the atlas may be applied to the patient-specific image. Because the correspondence mapping is estimation, and the spine is an articulated body, the spine domain (S) is defined as a neighborhood around the spine labels in the patient-specific image. Since the aorta is located close to the spine and the spine dominates the aorta in the coarse global registration, a domain is defined for the aorta (A) relative to the spine. The aorta domain (A) includes a neighborhood of the expected position of the aorta considering the inaccuracy of the coarse global registration and the inter-patient variability of the position of the aorta relative to the spine.

The aorta domain (A) may also contain other structures, for example, parts of the spine, because the corresponding region of interest may not be defined sufficiently tightly. This, interfering structures due to the variability in relative arrangement remains. The influence of interfering structures may be eliminated in a pre-processing step by defining the atlas image data without the interfering structures from the atlas image data by setting the intensity for all voxels that, based on the atlas labels, are not part of the structure to a typical value of the background tissue. The pre-processing may be done once per atlas and yields a different floating image that may be used for the local optimization.

Though the interfering structures may be removed, there remains an undesirably imposed smoothness between unrelated structures (the spine and the aorta) by the global mapping. Because of the proximity of spine and aorta, there are coefficients that are modified by optimizers of both domains. A situational optimization for the spine and then for the aorta, would result in an unacceptable optimization for the spine. Uncoupling these two structures by having independent sets of coefficients for each in the second level (of FIG. 2) and each subsequent level allows better mapping of each of the structures.

It is also possible to choose different spline spacings for the independent structures if different resolutions of the transformation function are desired. Both sets are initialized from the same coefficients of the coarser level, but one will be optimized over the spine domain and used to establish the correspondence for the spine labels and the other one is used for the aorta.

The resultant domain decomposition is shown in FIG. 1. Domain (G) contains the entire image, domain (S) covers a neighborhood of the spine and domain (A), a region containing the aorta. The corresponding optimization strategy is shown in FIG. 3. After a coarse global optimization with optimizer G3, the aorta (A) and the spine (S) domains are uncoupled and their registration from coarse to fine is carried out independently. Optimizer S2 (level 2) and S1 (level 1) are used for spine registration, and A2 and A1 are used for aorta registration. In the illustrated embodiment A1 includes two similar optimizers (A1.1 and A1.2) with different settings. The optimizers are applied sequentially for aorta registration.

The method illustrated in FIG. 3 allows the optimization of specific features of an image independently since ideal optimization parameters for one feature may not be the same as another feature. The atlas data may include optimization parameters specifically tailored to each feature in the atlas. The atlas data is used to not only label features of interest, but to provide specific optimization parameters for the features of interest.

Examples of optimization parameters, and the determination of the parameters is described below. Once the determination of the optimization parameters for each feature of interest is complete, the optimization parameters may be added to a data file associated with the atlas image. The data file and atlas image may then be used to register and label patient images using the optimization parameters saved in the data file. Thus, patient images may be properly registered using the determined optimization parameters for each region of interest in the atlas image.

Apart from the B-Spline control point distribution that defines degrees of freedom of the transformation model, there are other settings that may influence the registration. Knowledge about properties of the image intensity distribution in and around a particular structure into the registration process can be inferred from the atlas and from coarser-level approximations of the transformation function.

Figure 4A:
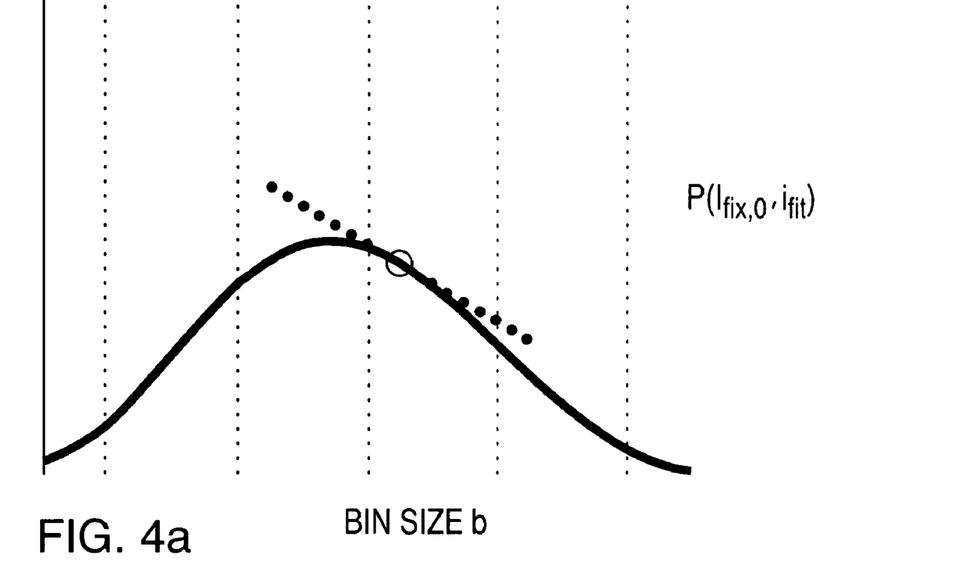
FIGS. 4a and 4b illustrate estimations of joint probability density functions.
Figure 4B:
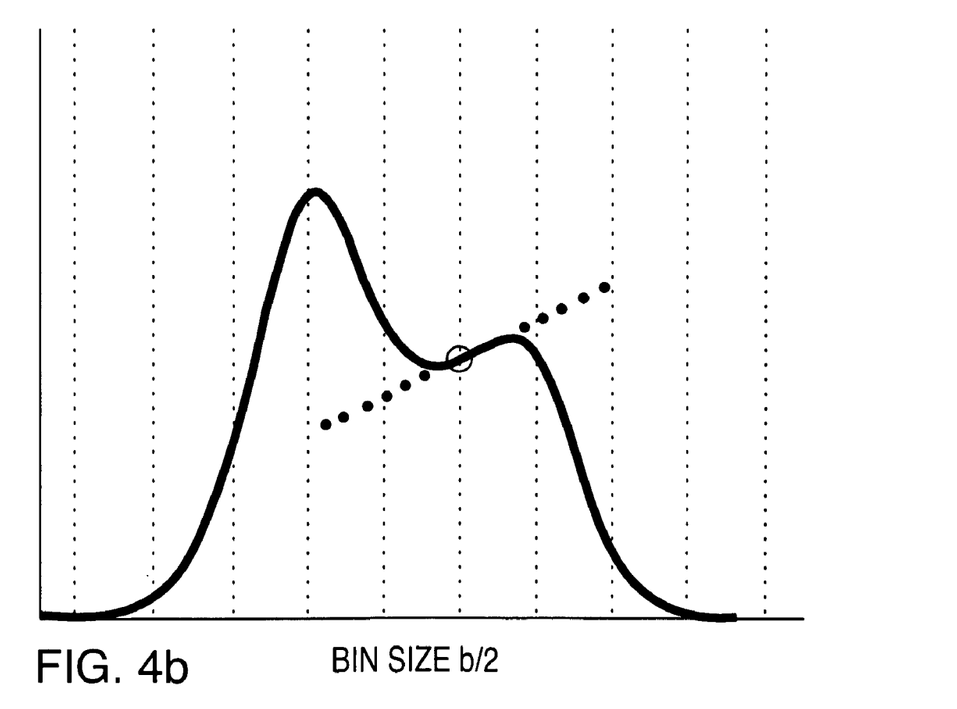

A Parzen approximation of a joint histogram is used. The size of the histogram bins is an important decision. A larger bin size may cause the joint probability density function (PDF) to be smoother. FIG. 4a illustrates a PDF estimation for a specific discrete distribution of intensity pairs $\{I_{fix,n}, I_{flt,n}\}$ (the plot is for a specific intensity $I_{fix,0}$ in the fixed image) with a bin size b. FIG. 4b is similar to FIG. 4a, but uses a smaller bin size of b/2. In FIG. 4b, two local maxima are shown. In FIG. 4a, the two local maxima are merged into one maxima because of the larger bin size. This has an impact on the gradient of the metric and therefore on the optimization process. The contribution of the point at coordinates x that is mapped to $g(x; \mu)$ to the derivative of the metric S with respect to a transformation parameter $\mu_i$ is $$\frac{\partial S}{\partial \mu_i} = \quad (1)$$

$$-\alpha \frac{\partial p(i_{fix}, i_{flt})}{\partial i_{flt}}\bigg|_{i_{fix}=f_{fix}(x), i_{flt}=f_{flt}(g(x))} \cdot \left(\frac{\partial}{\partial \xi} f_{flt}(\xi)\bigg|_{\xi=g(x;\mu)}\right)^T \cdot \frac{\partial}{\partial \mu_i} g(x; \mu),$$

where $\alpha$ is a normalization scale factor, $f_{fix}(x)$ is the intensity in the fixed image at x, and $f_{flt}(x)$ is the floating image intensity. The gradient of the metric depends on the derivative of the joint PDF $p(i_{fix}, i_{flt})$ with respect to the floating image intensity but not on that of the fixed image intensity. Considering the case that a point with intensity $I_{fix,0}$ is mapped to a point in the floating image with the intensity marked with the circle in the plots, the sign of the factor $$\frac{\partial p(i_{fix}, i_{flt})}{\partial i_{flt}}$$

in equation 1 changes between the estimations in FIGS. 4a and 4b.

The aorta and its surrounding tissue form two relatively homogeneous regions of different intensity. If the aorta has already been roughly mapped but there is still overlap with the surrounding tissue, the joint PDF will contain separate peaks for the correct mapping to the aorta and for the incorrect one to the surrounding tissue if the bin size is small. This may cause the optimization to be caught in a local optimum. Therefore, first applying an optimizer to the aorta domain that uses large bins eventually smoothes out close local maxima into one. Because the floating image (reference image) is the atlas, for which the intensity distribution is known, the floating image bin size is set in a way that the aorta and the surrounding tissue intensity are mapped into adjacent bins. This optimizer significantly improves the mapping of the aorta, and another optimizer that uses finer binning may be applied later.

Other examples of optimization parameters that may be used with B-Splines are B-Spline control point grid width and B-Spline order (e.g., quadratic and cubic). Regarding the mutual information, parameters may include, for example, fixed image bin size, floating image bin size, histogram lower bound (ignore all intensities below a threshold), and histogram upper bound (ignore all intensities above a threshold).

The illustrated examples use a gradient descent optimizer. An example of an optimization parameter is the maximum number of iterations or what other termination conditions to use. Other embodiments may use another type of optimizer, such as, for example, Levenberg-Marquardt that has associated optimization parameters.

Alternate embodiments may use different transformation models, for example, linear registration or completely free form. Regularization may be used, such as, for example, spring-like and Laplacian. Each regularization method has parameters such as, for example, the weight of the regularization term with respect to the similarity metric term.

In the cases where the current coefficients cause a given structure to be mapped mostly to another structure, global maxima in the joint PDF may result that do not correspond to a correct match. Looking at the joint PDF at a global scope, this possibly is compensated by having well-mapped structures with similar image intensity properties. But when just looking at a particular domain where the mapping is poor, the joint PDF is adapted to contain the correct global optima. Otherwise, independently of the bin size, the optimizer is caught in a local optimum of the similarity metric, and the optimizer may not find coefficients that map the structure successfully.

Figure 5:
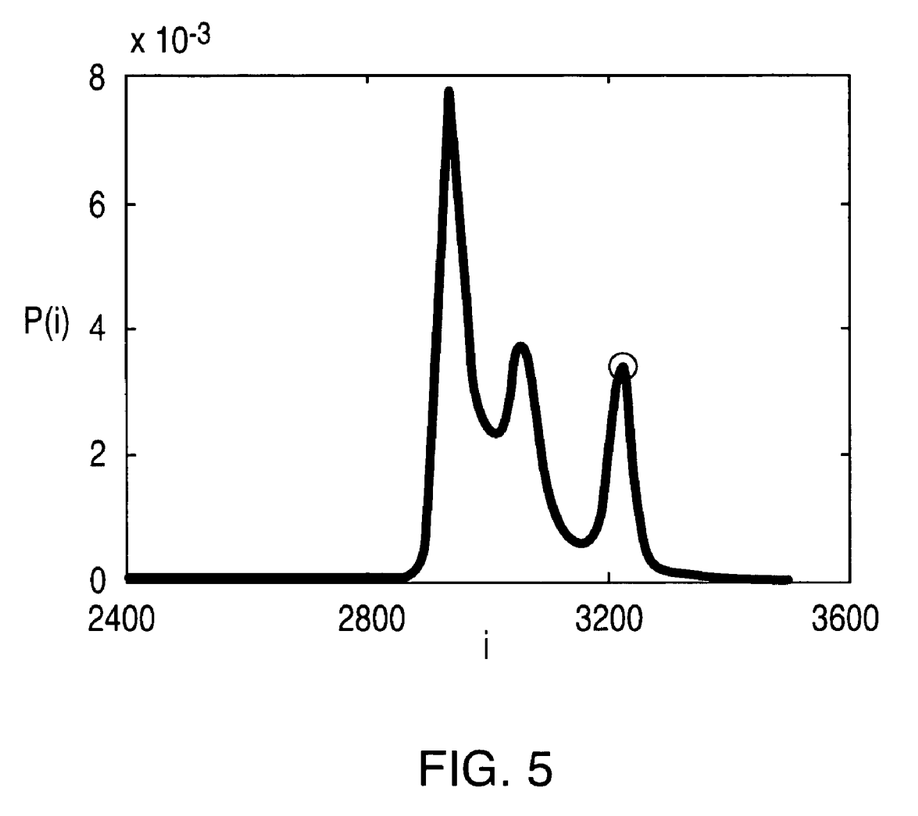
FIG. 5 illustrates an intensity distribution of a target image.

The correct global maxima of the joint PDF may be determined by, for example, using a weighted sum of the global and local joint PDFs. An alternate method, using the weighted sum of the local joint PDF and a joint PDF $p_c$ created automatically, with the goal that it should evaluate to high probability values for correctly mapped intensity pairs but not in case of incorrect mapping. In the case of the aorta, using a $p_c(i_{fix}, i_{flt})$ with a single peak around $\{i_{fix}=I_{fix,aorta}, i_{flt}=I_{flt,aorta}\}$ The intensity distribution within the aorta is relatively homogeneous. The distribution of the atlas image is known, and $I_{flt,aorta}$ may be chosen as a typical value of the atlas image inside the aorta. The registration of the spine is used to estimate the patient value $I_{fix,aorta}$. The PDF of the intensity values in the neighborhood of the spine excluding the spine itself is used. This typically yields a distribution similar to the distribution illustrated in FIG. 5. In contrast CT images, the aorta has a higher intensity than the other surrounding structures, and we therefore $I_{fix,aorta}$ is chosen as the intensity at which the peak is marked with a circle.

Figure 6:
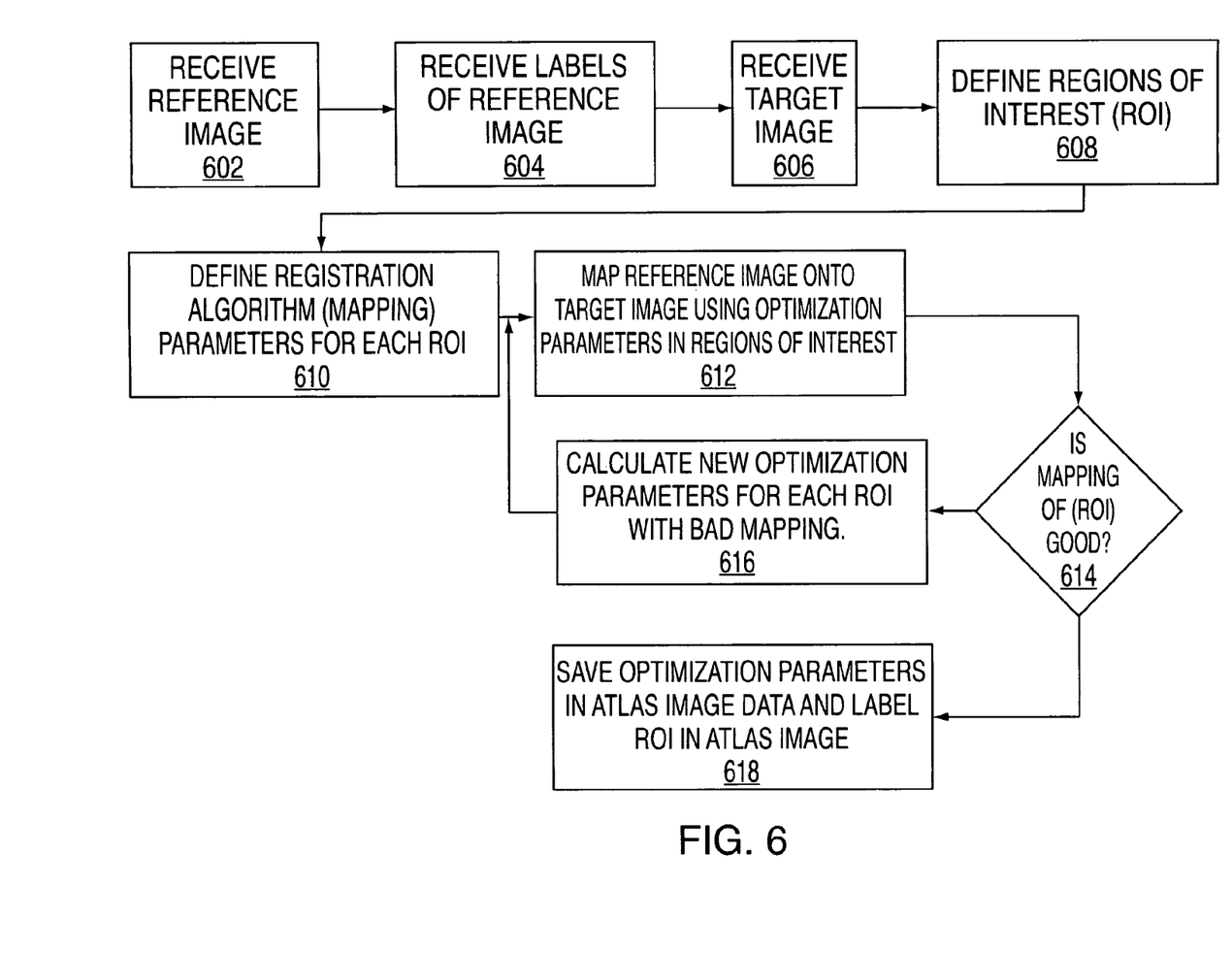
FIG. 6 illustrates a block diagram of an exemplary method for defining an atlas and atlas data.

FIG. 6 illustrates a block diagram of an exemplary method for defining an atlas image and atlas image data. A reference image is received in block 602. In block 604, labels of the reference image are received. In block 606, a target image similar to the reference image is received such as, for example, a sample patient image. In block 608, regions of interest (ROI) are defined. For example, a spine domain and an aorta domain may be defined. In block 610, registration algorithm optimization parameters are received for each ROI. In block 612, the reference image is globally mapped onto the target image using a transform, such as, for example a B-spline function. In block 614, the effectiveness of the mapping is determined in each ROI, for example, joint histograms of the ROIs are calculated, and mutual information is calculated from the joint histograms. The mutual information is used to determine the effectiveness of the mapping in each ROI. If the mapping is not effective in an ROI, new optimization parameters of the regions of interest having the poor mapping are calculated in block 616, and the reference image is mapped using the new optimization parameters and the previous good optimization parameters in the associated ROIs in block 612. If the mapping is good, the optimization parameters are saved in a data file associated with the atlas image, and the ROIs in the atlas image may be labeled in block 618.

The above-illustrated method may be performed in a similar manner for any number of regions of interest. The method is also not limited to mapping the regions of interest in series, but allows the regions of interest to be mapped simultaneously. For example, in alternate exemplary methods, if the mutual information shows that the mapping of regions of interest are not satisfactory, new optimization parameters for each region of interest may be calculated and the new optimization parameters may be applied in a single mapping step. Following the mapping step, joint histograms, and mutual information may be calculated for each region of interest and a determination may be made as to the success of the mapping. This may then be repeated until the final optimization parameters are determined and saved.

Figure 7:
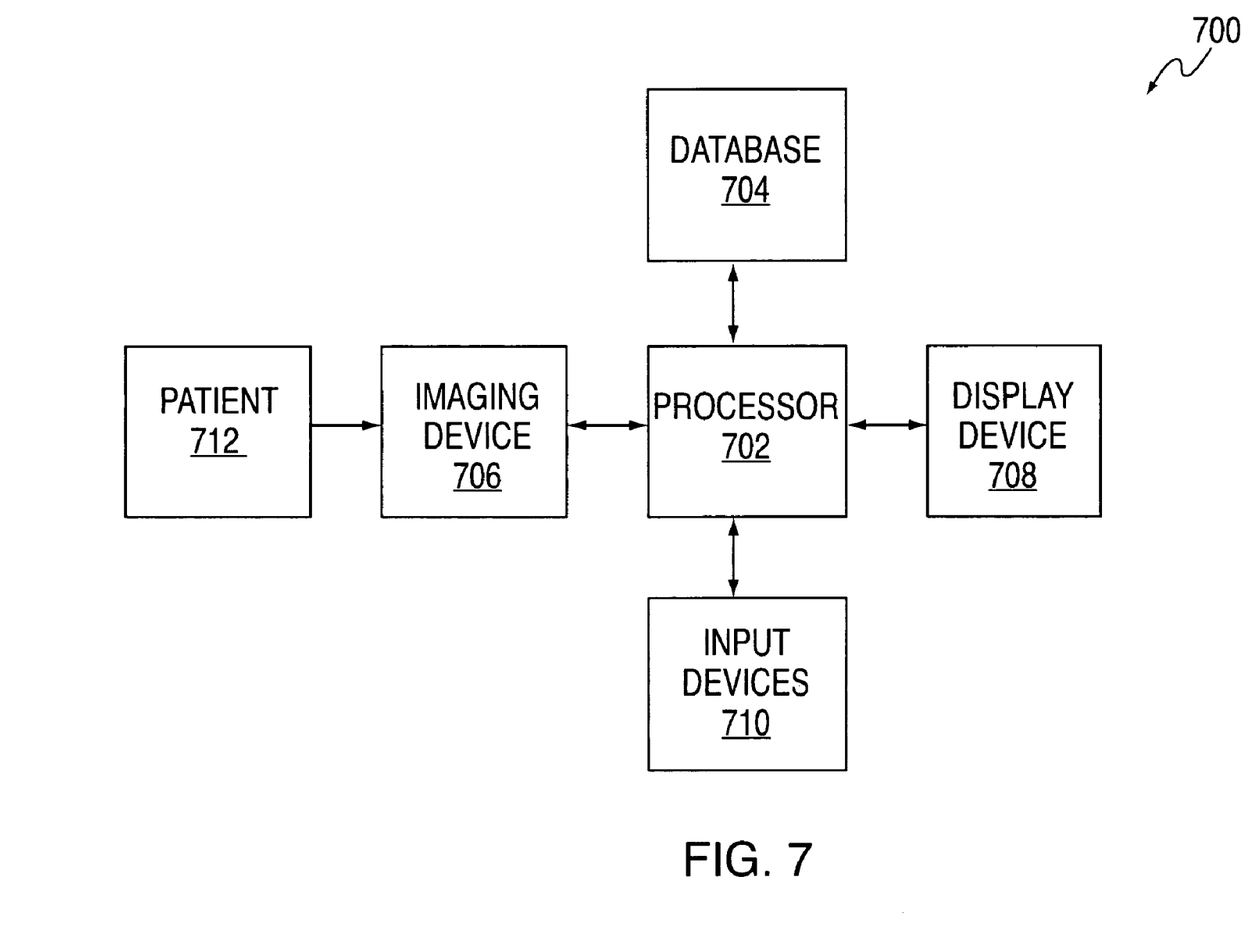
FIG. 7 illustrates an exemplary block diagram of a medical imaging system.

FIG. 7 illustrates an exemplary block diagram of a medical imaging system that may be used to perform the methods described above. The system 700 includes a processor 702 communicatively connected to a database 704, an imaging device 706, a display device 708, and an input device 710. In operation, the imaging device 706 takes medical images of a patient 712. The images may be stored in the database 704. The processor 702 may then perform methods similar to the methods described above, where atlas, reference, and target images are stored in the database 704, processed by the processor 702, and displayed on the display device 708.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for defining an atlas image data for optimizing images, the method comprising:
   receiving a reference image;
   receiving a target image;
   defining a first region of interest on the reference image;
   defining a second region of interest on the reference image;
   calculating a first optimization parameter associated with the first region of interest;
   calculating a second optimization parameter associated with the second region of interest;
   mapping the reference image onto the area of the first region of interest on the global mapped image using the first optimization parameter resulting in a first optimized image of the first region of interest;
   mapping the reference image onto the area of the second region of interest on the global mapped image using the second optimization parameter resulting in a first optimized image of the second region of interest;
   determining whether the mapping associated with the first region of interest is satisfactory;
   calculating a third optimization parameter associated with the first region of interest responsive to determining that the mapping of the first region of interest is unsatisfactory; and
   saving the first optimization parameter associated with the first region of interest in an atlas image data file responsive to determining that the mapping of the first region of interest is satisfactory, wherein the atlas image data file is used in mapping patient images for medical diagnosis.

2. The method of claim 1, wherein the method further comprises:
   determining whether the mapping associated with the second region of interest is satisfactory;
   calculating a fourth optimization parameter associated with the second region of interest responsive to determining that the mapping of the second region of interest is unsatisfactory; and
   saving the second optimization parameter associated with the second region of interest in an atlas image data file responsive to determining that the mapping of the second region of interest is satisfactory.

3. The method of claim 1, wherein the method further comprises:
   calculating a first joint histogram of the first region of interest and a second joint histogram of the second region of interest responsive to mapping the reference image onto the target image resulting in a global mapped image; and
   calculating mutual information from the first and second joint histograms.

4. The method of claim 3, wherein the determining whether the mapping associated with the second region of interest is satisfactory includes:
   calculating a fourth joint histogram of the second region of interest;
   calculating mutual information from the fourth histogram; and analyzing the mutual information from the fourth histogram.

5. The method of claim 1, wherein the determining whether the mapping associated with the first region of interest is satisfactory includes:

calculating a third joint histogram of the first region of interest;

calculating mutual information from the third histogram; and analyzing the mutual information from the third histogram.

6. The method of claim 1, wherein the method further comprises:

labeling the first feature of interest; and saving the label of the first feature of interest in the atlas image data file.

7. The method of claim 1, wherein the method further comprises:

labeling the second feature of interest; and saving the label of the second feature of interest in the atlas image data file.

* * * * *